US007573380B2

(12) United States Patent
Pinder

(10) Patent No.: US 7,573,380 B2
(45) Date of Patent: Aug. 11, 2009

(54) METHOD AND SYSTEM FOR REQUESTING HELP BY USER OF COMMUNICATION DEVICE

(75) Inventor: Ellis A. Pinder, Davie, FL (US)

(73) Assignee: Motorola, Inc., Schaumburg, IL (US)

( * ) Notice: Subject to any disclaimer, the term of this patent is extended or adjusted under 35 U.S.C. 154(b) by 362 days.

(21) Appl. No.: 11/427,993

(22) Filed: Jun. 30, 2006

(65) Prior Publication Data

US 2008/0001733 A1    Jan. 3, 2008

(51) Int. Cl.
    *G08B 1/08* (2006.01)
(52) U.S. Cl. .............................. 340/539.11; 340/539.13; 340/539.26; 340/573.1; 340/573.4; 340/574; 455/404.1
(58) Field of Classification Search ............ 340/539.11, 340/539.13, 539.26, 573.1, 573.4, 574; 455/404.1, 455/404
    See application file for complete search history.

(56) References Cited

U.S. PATENT DOCUMENTS

| | | | | |
|---|---|---|---|---|
| 5,602,901 | A | * | 2/1997 | Redden et al. ........... 455/404.2 |
| 5,742,904 | A | | 4/1998 | Pinder et al. |
| 6,038,438 | A | * | 3/2000 | Beeson et al. ............ 455/404.2 |
| 6,256,497 | B1 | * | 7/2001 | Chambers ................... 455/433 |
| 6,917,797 | B1 | * | 7/2005 | Hoppa ..................... 455/404.1 |
| 2005/0003831 | A1 | | 1/2005 | Anderson |
| 2005/0143049 | A1 | | 6/2005 | Hoke, Jr. |
| 2006/0007038 | A1 | | 1/2006 | Boling et al. |

OTHER PUBLICATIONS

406 MHz Beacon Coding Guidelines For USA National Use Fields Dated Nov. 17, 2000—8 Pages.

* cited by examiner

*Primary Examiner*—Tai T Nguyen
(74) *Attorney, Agent, or Firm*—Barbara R. Doutre

(57) ABSTRACT

A method (300) for requesting help by a user of a communication device (102) is disclosed. The method includes initiating (304) an emergency call by the user and successively attempting (306) to transmit a distress message to a communication system from a plurality of communication systems based on a predefined priority sequence. The predefined sequence includes a list of the communication systems (104, 106, 108, 110, and 112) arranged according to a pre-assigned priority wherein a satellite based system (112) is preferably assigned the lowest priority. Once one of the systems acknowledges the distress message, the user is notified. The method includes automatically accessing the satellite-based distress system (312), when attempts to detect the other communication systems based on the predefined sequence have failed.

5 Claims, 10 Drawing Sheets

*1100*

| PRIORITY | COMMUNICATION NETWORK |
|---|---|
| 1 | PRIMARY TRUNKING SYSTEM |
| 2 | ALTERNATE TRUNKING SYSTEM |
| 3 | MUTUAL-AID FREQUENCY SYSTEM |
| 4 | DATA SYSTEM |
| 5 | SATELLITE-BASED DISTRESS SYSTEM |

| PRIORITY | COMMUNICATION NETWORK |
|---|---|
| 1 | FAMILY RADIO SERVICE SYSTEM |
| 2 | GENERAL MOBILE RADIO SERVICE SYSTEM |
| 3 | SATELLITE-BASED DISTRESS SYSTEM |

*FIG. 9*

METHOD AND SYSTEM FOR REQUESTING HELP BY USER OF COMMUNICATION DEVICE

FIELD OF THE INVENTION

The present invention relates generally to the field of communication systems. In particular, the present invention relates to a method and system for requesting help through a communication system.

BACKGROUND OF THE INVENTION

The users of communication devices, such as the users of two-way radios, may work in remote regions, performing regular duties or responding to special events. Examples of such users can include forest service personnel, backcountry park rangers, forest firefighting crews, local law enforcement agency personnel, and other public safety users.

Such remote regions can completely lack a communication system infrastructure, or can lack complete coverage due to practical considerations such as rough terrain, a high mountain, a canyon or low population density. Additionally, the users who are covered by the communication system infrastructure can occasionally venture beyond the coverage area of the communication system infrastructure, and thus may not be able to communicate in the time of distress.

A known method of requesting help by a user requires the use of an emergency feature on a trunked or a conventional two-way radio to indicate a serious situation, requiring immediate response. Another known method requires the use of a satellite-based distress system on land, in the form of a personal locator beacon (PLB) integrated into a two-way radio. In yet another known method, a distress message is sent to a neighboring communication system using a guest-identification when the user is not in the coverage of a primary communication system. These known methods suffer from several different limitations and inconveniences including the inability to request help in an area lacking coverage and having to use additional devices for detecting the location of a user.

In light of the above discussion, there is a need for a method for requesting help when a user is in a remote region. Further, the method should eliminate the need of separate devices for location detection and communication. Further, the methods should ensure that the help is received in a least possible time. The method should also ensure that the help is received in a most cost-effective manner. Moreover, the implementation of the method should not require huge capital investment.

BRIEF DESCRIPTION OF THE DRAWINGS

The accompanying figures, where like reference numerals refer to identical or functionally similar elements throughout the separate views, and which, together with the detailed description below, are incorporated in and form part of the specification, serve to further illustrate various embodiments and explain various principles and advantages, all in accordance with the present invention.

FIG. 8 illustrates an exemplary predefined sequence, in accordance with an embodiment of the present invention;

FIG. 9 illustrates an exemplary predefined sequence, in accordance with another embodiment of the present invention.

Figure 1:
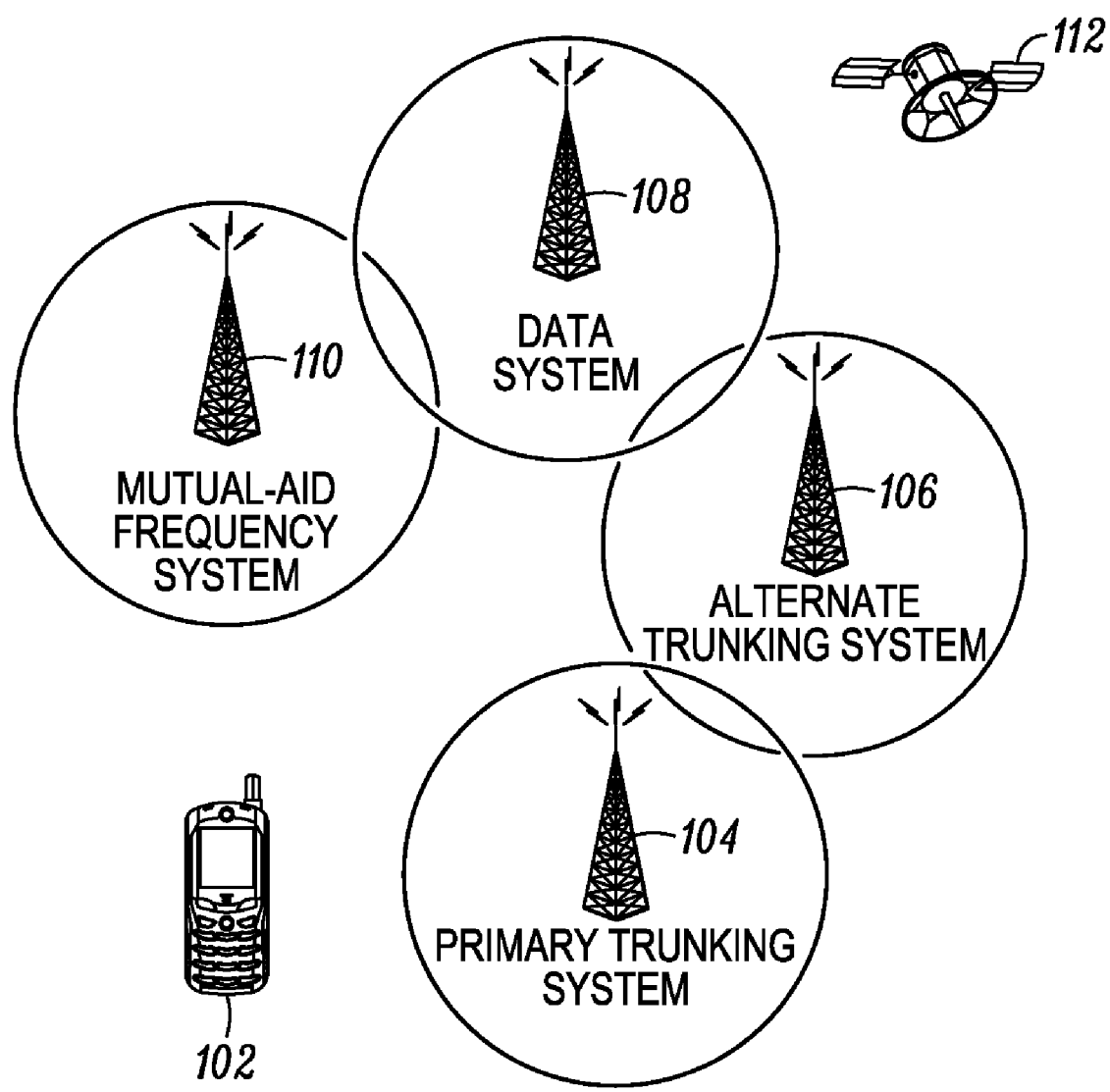
FIG. 1 illustrates an exemplary environment, where various embodiments of the present invention can be practiced.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

In accordance with the present invention, there is provided herein a method and a system for requesting help by a user of a communication device. The two broad categories of users that can benefit from the present invention are public safety users and recreational users. The public safety users traditionally operate in a communication system that supports distress signaling. The public safety users can occasionally go beyond coverage of the communication system and encounter an area of no-coverage. In contrast, the recreational users normally operate in communication systems not supporting a fixed infrastructure but instead can operate in either a direct mode/talk-around mode.

For one embodiment of the present invention, a method for requesting help by a user of a communication device is provided. The method includes an emergency call (also referred to as a distress call) being initiated by the user. The method also includes successively attempting to detect a communication system based on a predefined sequence. The predefined sequence includes a list of a plurality of communication systems, arranged according to a priority. The method also includes sending a distress message to the detected communication system. Further, the method includes automatically accessing a satellite-based distress system when attempts to detect the communication system of the plurality of communication systems based on the predefined sequence have failed.

For another embodiment of the present invention, a method for requesting help by a user of a communication device is provided. The method includes attempting to detect a communication system, based on predefined criteria. The method also includes sending a distress message to the detected communication system. Moreover, the method includes sending the distress message to a satellite-based distress system when a response to the distress message in the communication system is undetected and the one or more communication systems are unavailable. The satellite-based distress system is accessed based on the predefined criteria.

For yet another embodiment of the present invention, a communication device is provided. The communication device includes an identity key that is capable of storing an identification of the communication device and/or an identification of a user of the communication device. The communication device also includes a memory capable of storing a predefined sequence of a plurality of communication systems. The predefined sequence includes a list of the plurality of communication systems arranged according to a priority assigned to each of the plurality of communication systems. Further, the communication device includes a transceiver that is capable of successively attempting to detect a communication system based on the predefined sequence. The transceiver accesses a satellite-based distress system when attempts to detect the communication system of the plurality of communication systems have failed.

Before describing in detail a method and a system for requesting help by a user of a communication device, in accordance with the present invention, it should be observed that the present invention resides primarily in combinations of method steps and apparatus components related to a digital or an analog transmitter. Accordingly, the apparatus components and the method steps have been represented, where appropriate, by conventional symbols in the drawings. These drawings show only the specific details that are pertinent for understanding the present invention, so as not to obscure the disclosure with details that will be apparent to those with ordinary skill in the art with the benefit of the description herein.

In this document, relational terms such as first and second, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

FIG. 1 illustrates an exemplary environment 100, where various embodiments of the present invention can be practiced. The environment 100 includes a communication device 102. Various regions of the environment 100 can either be out of the coverage of any of the communication systems or may be covered by one or more communication systems. Examples of a communication system can include a primary trunking system, an alternate trunking system, a cellular system, a data system, a mutual-aid frequency system, a family radio service (FRS) system, a general mobile radio service (GMRS) system, a satellite-based distress system, and so forth. The communication device 102, in the environment 100, can be in the coverage of the one or more communication systems, depending on its location. Examples of the communication device 102 include, but are not limited to, a two-way radio, a mobile phone, and a wireless personal digital assistant (PDA).

The environment 100 includes a coverage area of a primary trunking system 104, a coverage area of an alternate trunking system 106, a coverage area of a data system 108, a coverage area of a mutual-aid frequency system 110, and a coverage area of a satellite-based distress system 112, system 112 having substantial continental or planetary coverage. In the primary trunking communication system 104 and/or the alternate trunking communication system 106, communication is through a set of radio frequencies, instead of through a dedicated communication channel. In data system 108, communication is primarily by exchange of data. The use of a mutual-aid frequency system is typically limited to public safety agencies. An example of the satellite-based distress system includes, but is not limited to, the COSPAS/SARSAT distress system. The COSPAS acronym stands for "Cosmicheskaya Sistyema Poiska Avariynich Sudov" which in the Russian language means Space System for the Search of Vessels in Distress. The SARSAT acronym stands for Search and Rescue Satellite-Aided Tracking. The COSPAS-SARSAT distress system includes a network of polar orbiting and geosynchronous satellites and multi-national rescue coordination centers that help to detect, track and coordinate rescue activities for distressed users.

Figure 2:
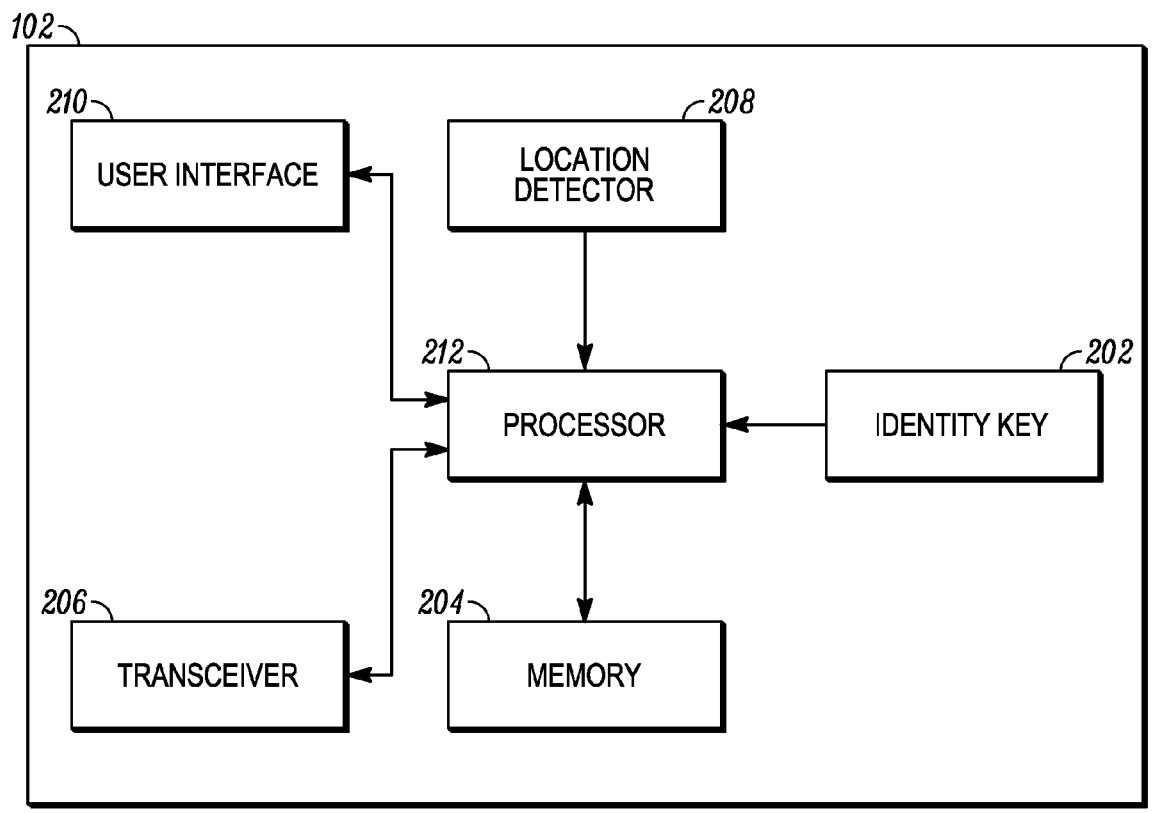
FIG. 2 is a block diagram of a communication device, in accordance with various embodiments of the present invention.

FIG. 2 is a block diagram of the communication device 102, in accordance with various embodiments of the present invention. An example of the communication device includes, but is not limited to, a two-way radio. The communication device 102 includes an identity key 202, a memory 204, and a transceiver 206. The identity key 202 can store the identification of the communication device 102 and/or the identification of the user of the communication device 102. For one embodiment, the identity key 202 can store an electronic serial number (ESN) to identify the communication device 102. The identity key 202 can be tamper-resistant, and clone resistant.

Figure 10:
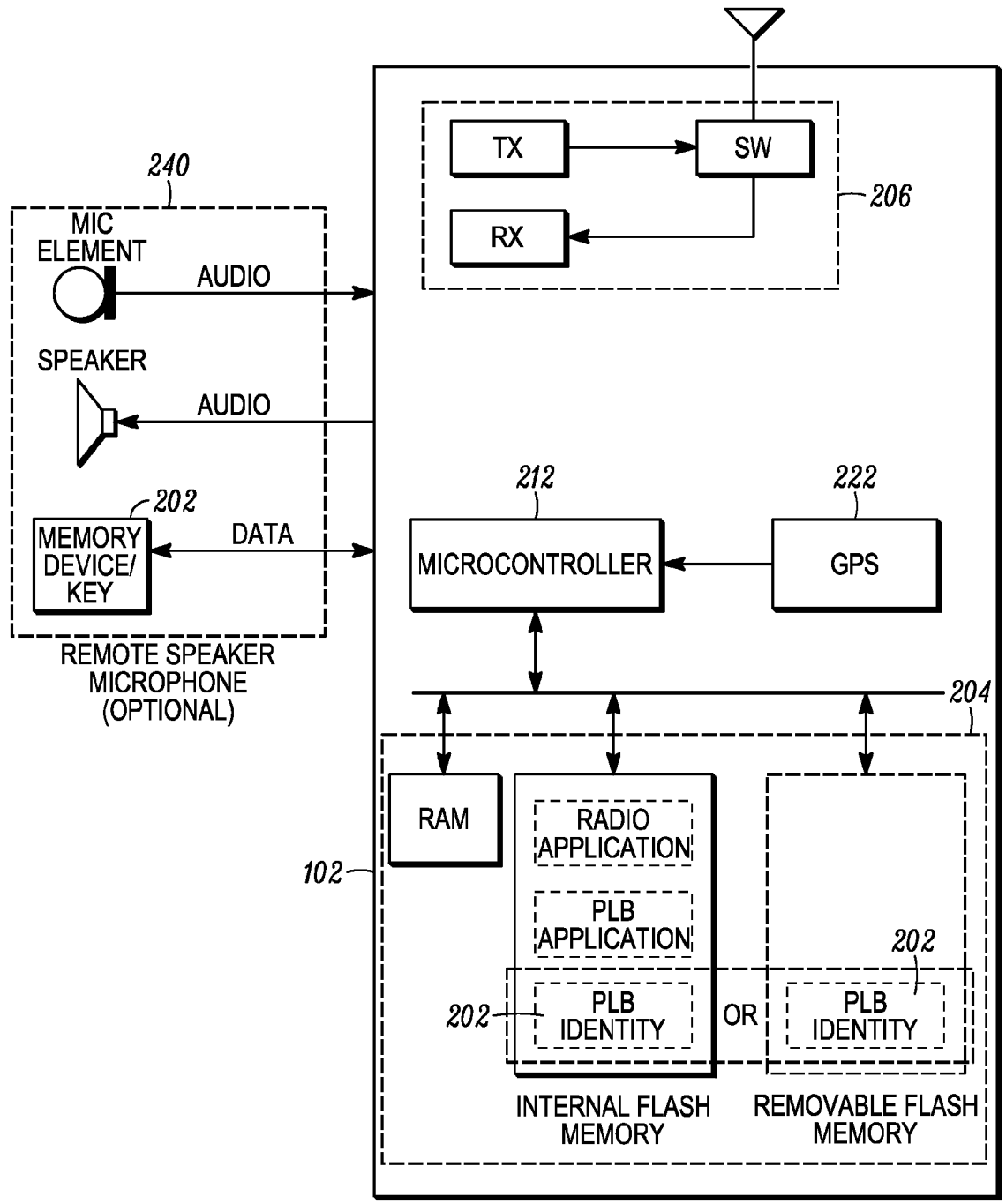
FIG. 10 is an example of a communication device formed in accordance with the present invention.
Figure 11:
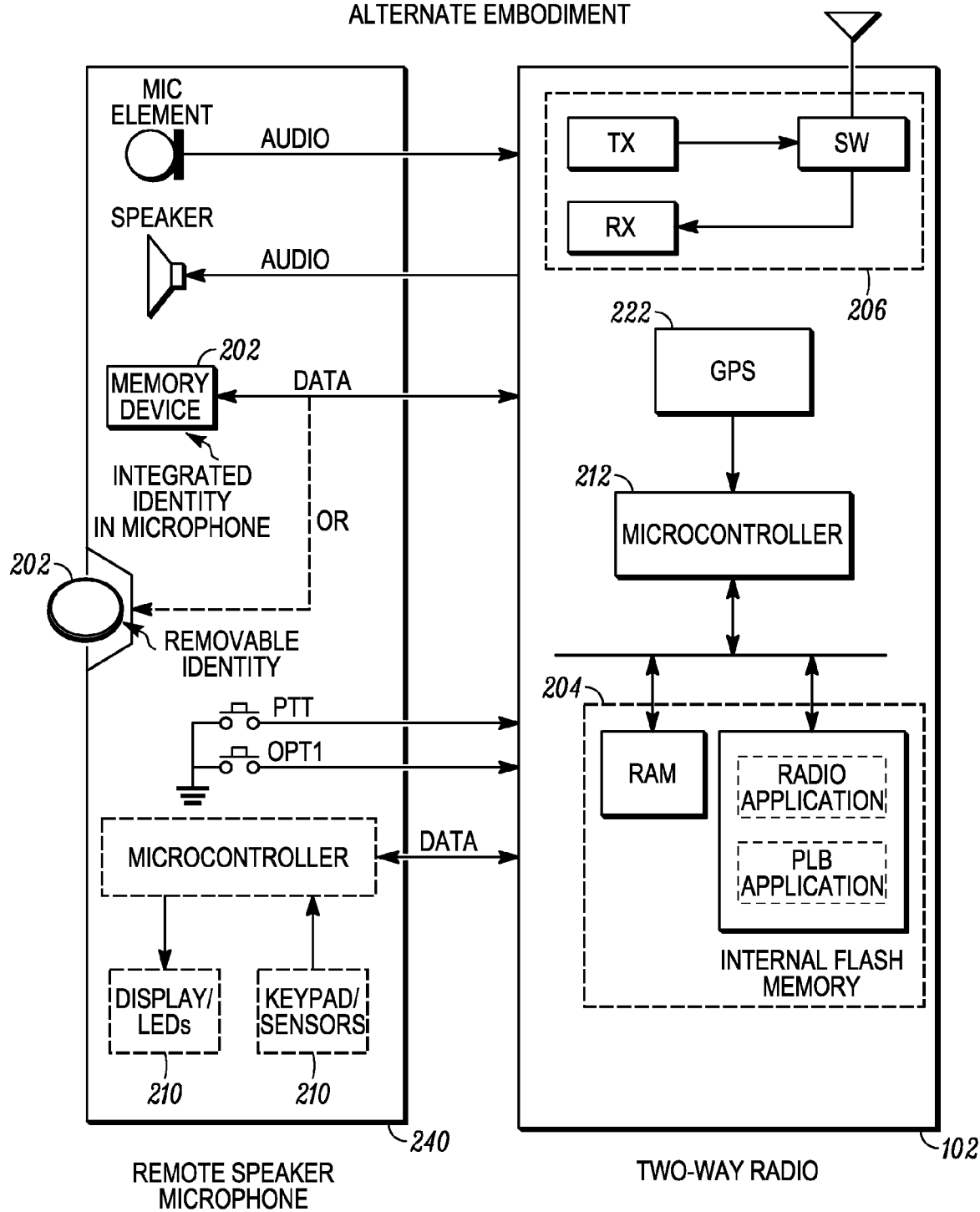
FIG. 11 is another example of a communication vice formed in accordance with the present invention.

For one embodiment of the invention, the identity key 202 can be stored (or embedded) in a removable memory that can be detached from the communication device 102. The use of the removable memory allows upgrading a previously purchased communication device, by connecting the removable memory with the identity key 202. An example of a removable memory having an identity key as is illustrated in FIGS. 10 and 11 and will be described later. For another embodiment, the identity key 202 can be 'built-in' in an accessory, such as a microphone, of the communication device 102. The identity key 202, in removable memory or 'built-in' in an accessory, provides a movable identity to the user. This allows the user to interoperate the identity key 202 with other communication devices. For yet another embodiment, the identity key 202 can be stored (or embedded) in internal memory 204 of the communication device 102.

For one embodiment, the identity key 202 enables personal locator beacon (PLB) functionality to the communication device 102. Without the identity key 202, the PLB functionality is disabled. An example of incorporation of a PLB application and identity is illustrated in FIGS. 10 and 11 to be discussed later. The PLB functionality allows the user to send a distress message that enables detection of the location of the communication device 102 by a satellite-based distress system. If the PLB functionality is enabled, then the current federal regulations require the user of the communication device 102 to register the communication device 102 with National Oceanographic and Atmospheric Administration (NOAA). The satellite-based distress system has a database of users, which enable rescue coordination centers to render assistance based on the distressed user's identification number. The database cross-references the user ID with contact information for the user as well as family and friends. Upon receipt of a distress message, the rescue coordination center will typically utilize the contact information before dispatching rescue resources in order to minimize wasting resources on false alarms. This embodiment allows the identity key 202 to be registered with NOAA instead of the communication device 102, allowing public safety agencies to assign the identity-key 202 to each user instead of assigning the communication device 102 to each user.

In accordance with a further embodiment of the invention, the memory 204, in the communication device 102, stores a pre-defined sequence of a plurality of communication systems. The predefined sequence includes a list of the plurality of communication systems. In the list, the communication systems are arranged according to the priority assigned to each one of them. The priority assigned to each communication system aims to provide a more local, a more responsive and a less costly help (or assistance). Based on the predefined sequence, the transceiver 206 successively attempts to detect a communication system from the plurality of communication systems. When the attempts to detect the communication system fail, the transceiver 206 will utilize the satellite-based distress system.

For one embodiment, the communication device 102 can also include a location detector 208. The location detector 208 determines geographic coordinates of the communication device 102. Examples of the location detector 208 include, but are not limited to, the Global Positioning System (GPS) and the Galileo System (being developed by the European Union).

For another embodiment, the communication device 102 also includes a user interface 210. The user interface 210 receives an input from the user of the communication device 102 to initiate an emergency call sequence. For one embodiment, the interface 210 can indicate the status of the emergency call.

The communication device 102 also includes a processor 212. Processor 212 executes software that controls radio operation and PLB operation. Those skilled in the art will recognize that processor 212 may be implemented as a multi-core processor or as multiple discrete processors, depending on the design of communication device 102.

Figure 3:
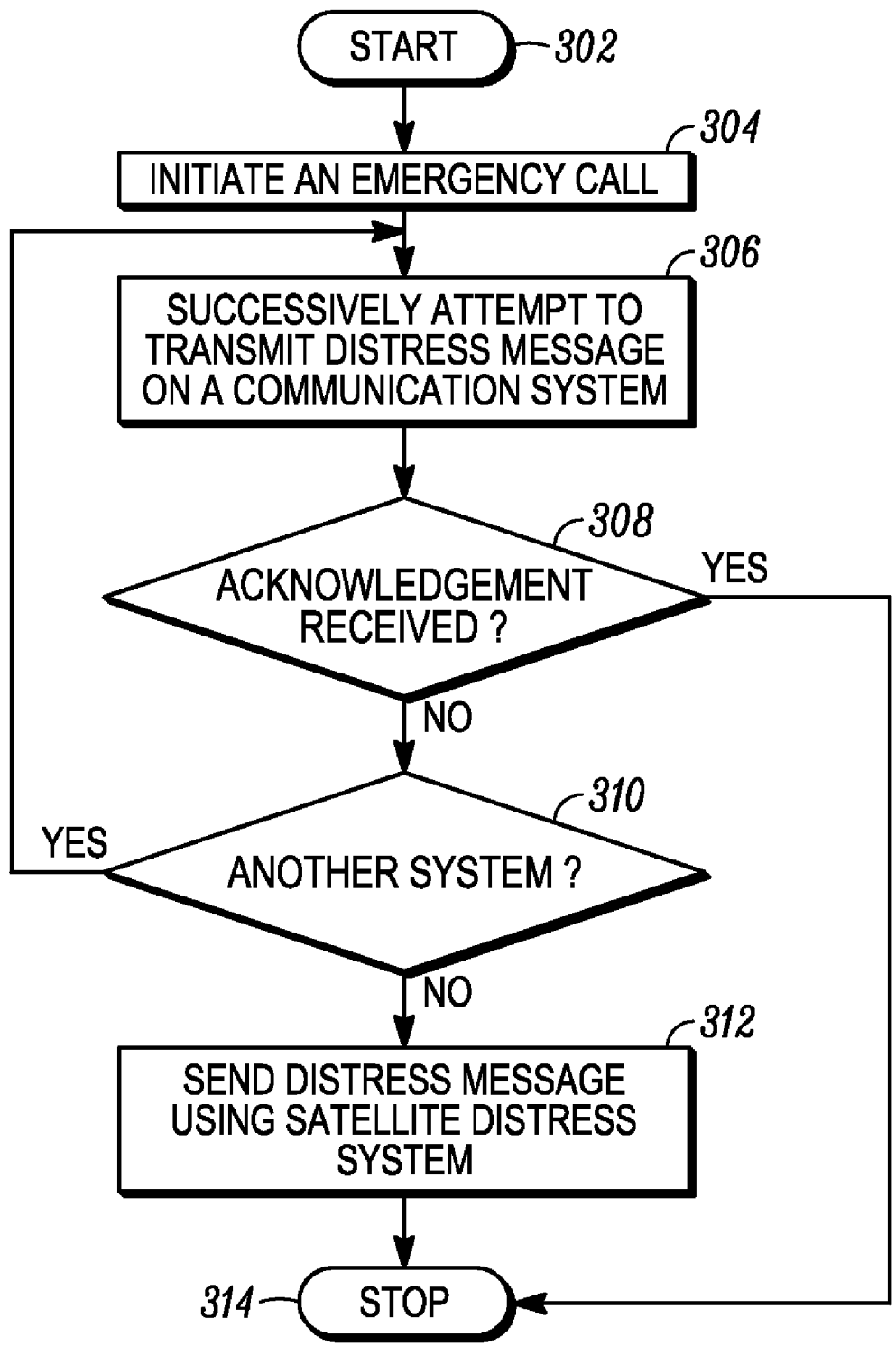
FIG. 3 is a flow diagram illustrating a method for requesting help, in accordance with one embodiment of the present invention.

FIG. 3 is a flow diagram illustrating a method 300 for requesting help by a user of the communication device 102, in accordance with an embodiment of the present invention. The method is initiated at step 302. At step 304, an emergency call is initiated by the user. At step 306, successive attempts are made by the communication device 102 to transmit a distress message to a communication system in region 100. In step 308 a determination is made whether an acknowledgement was received for the distress message. If an acknowledgement was received in step 308, then the method terminates at step 314. If an acknowledgement was not received in step 308, then step 310 decides whether another communication system is available in region 100, excluding satellite distress system 112. If another system is available, execution iterates at step 306. If another system is not available, then communication device 102 sends a distress message to a satellite-based distress system in step 312. Thereafter, method execution terminates at step 314.

The successive attempts in 306 are made for at least one of a predefined number of times for each communication system, referred to as a predefined retry limit and/or for a predefined time limit. The communication systems utilized in step 306 are based on a predefined sequence of systems. The predefined sequence includes a list of a plurality of communication systems, arranged according to a priority assigned to each system. The priority can be assigned to a communication system based on the time required to receive help and/or cost incurred to receive help as well as other criteria. For method 300, the least priority is assigned to the satellite-based distress system, which is handled last in step 312. Assigning higher priority to the local communication systems and assigning the lowest priority to the satellite system can be based on several factors. For example, the time required to receive help in a local communication system, such as from persons working in a nearby region, will be less than that in the satellite-based distress system. Also, the cost incurred in receiving help in the local communication system is likely to be less. Hence, a higher priority can be assigned to the local communication system(s) in the predefined sequence, and thus attempts are made to detect one of the local communication system(s) prior to accessing the satellite-based distress system.

For one embodiment, the distress message sent at step 308 can include at least one of the identification of the communication device 102, the identification of a user of the communication device 102, the coordinates of the communication device 102, and the contact frequency of the user of the communication device 102. For example, the distress message can include only the identification of the communication device 102, i.e., 1102AB5. For another example, the distress message can include following identifications: 1102AB5, John, N 4 degrees, S 0 degrees, Urgent and 462.5625 Megahertz (MHz). Although current satellite based systems do not send/transmit back signals in response to being accessed, one skilled in the art can foresee that as satellite based systems become further developed it is feasible that future systems could include the acknowledgment capability.

Figure 4:
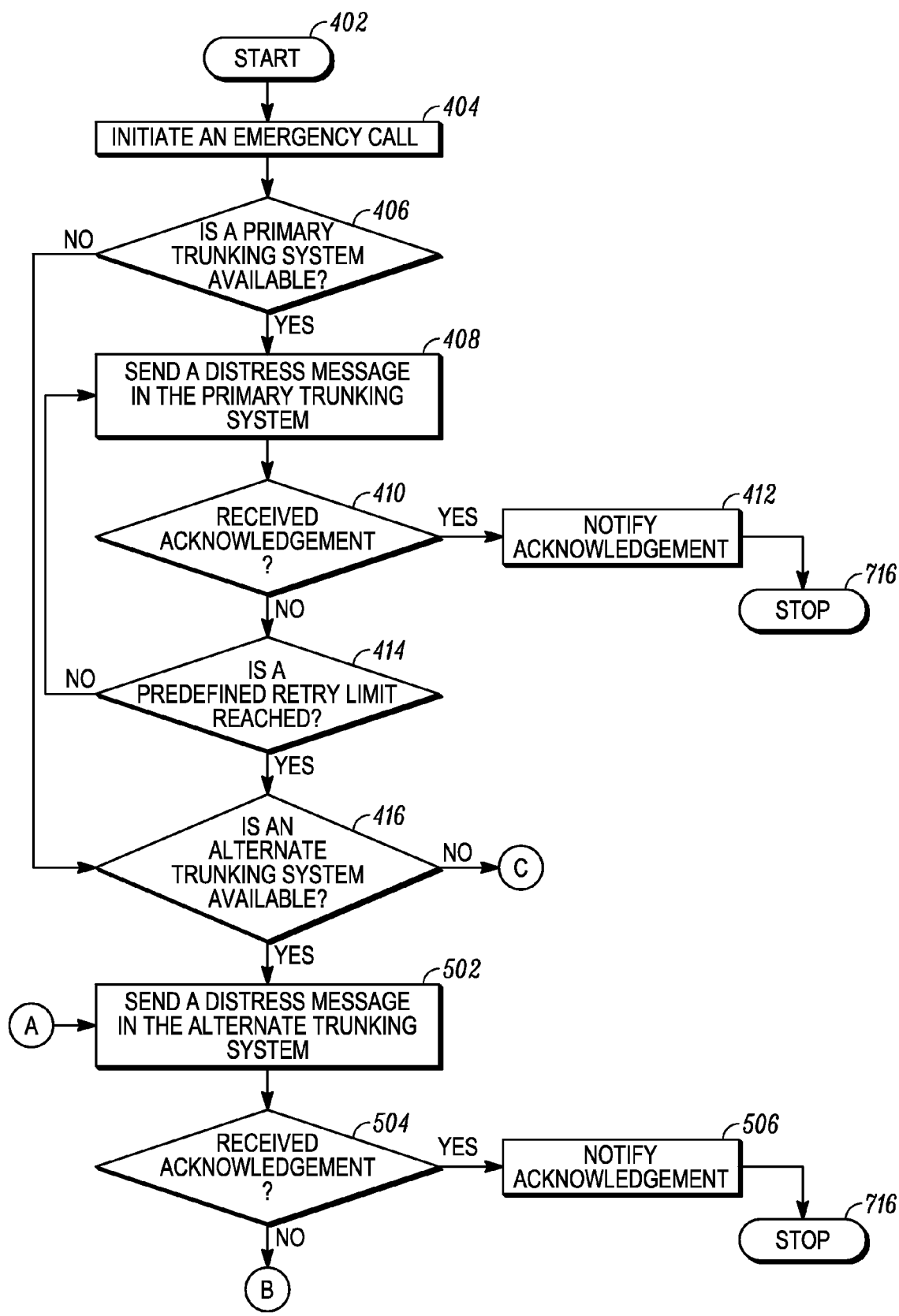
FIG. 4, FIG. 5, and FIG. 6 provide a flow diagram illustrating a method for requesting help, in accordance with another embodiment of the present invention.
Figure 5:
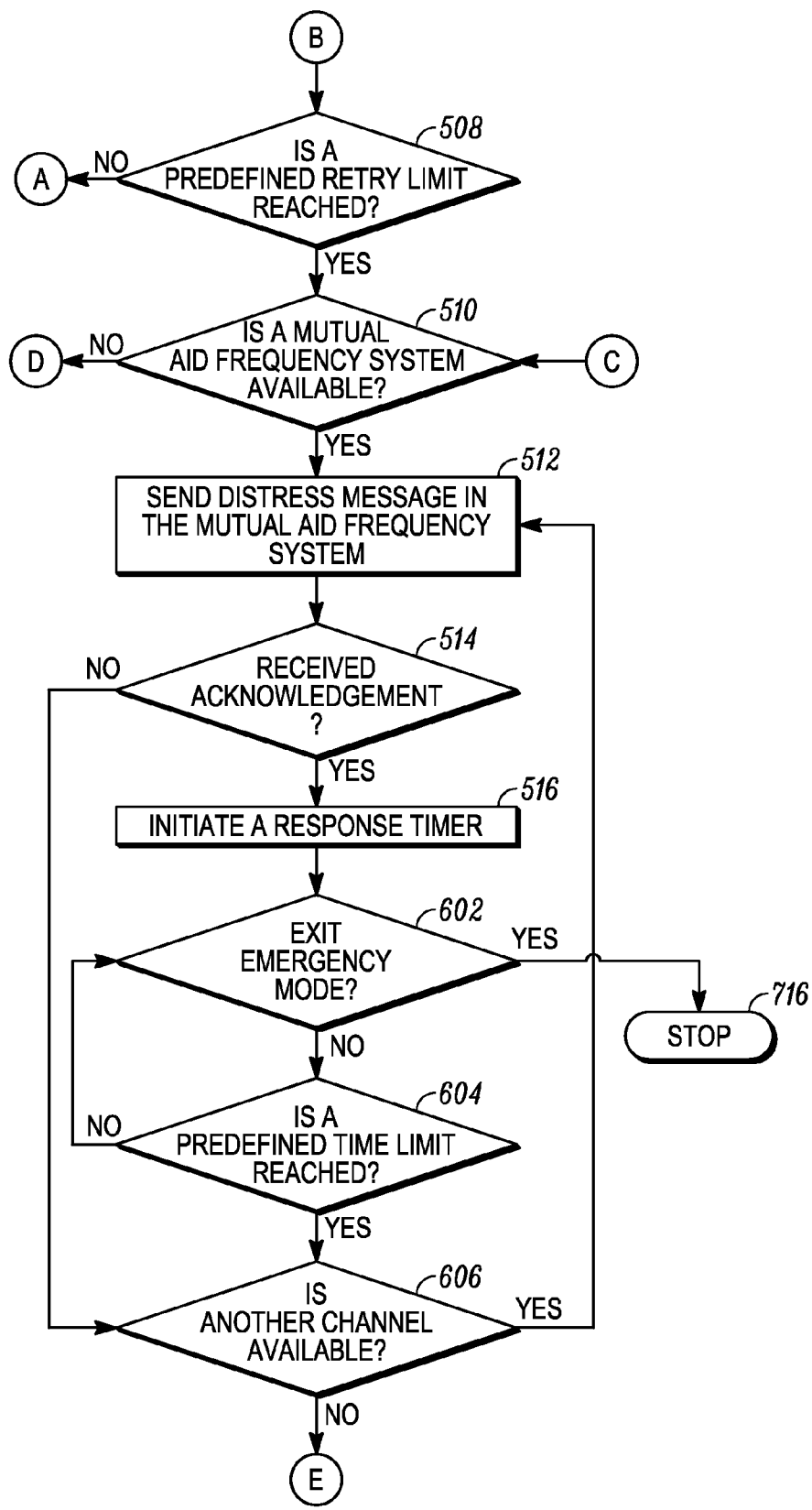
Figure 6:
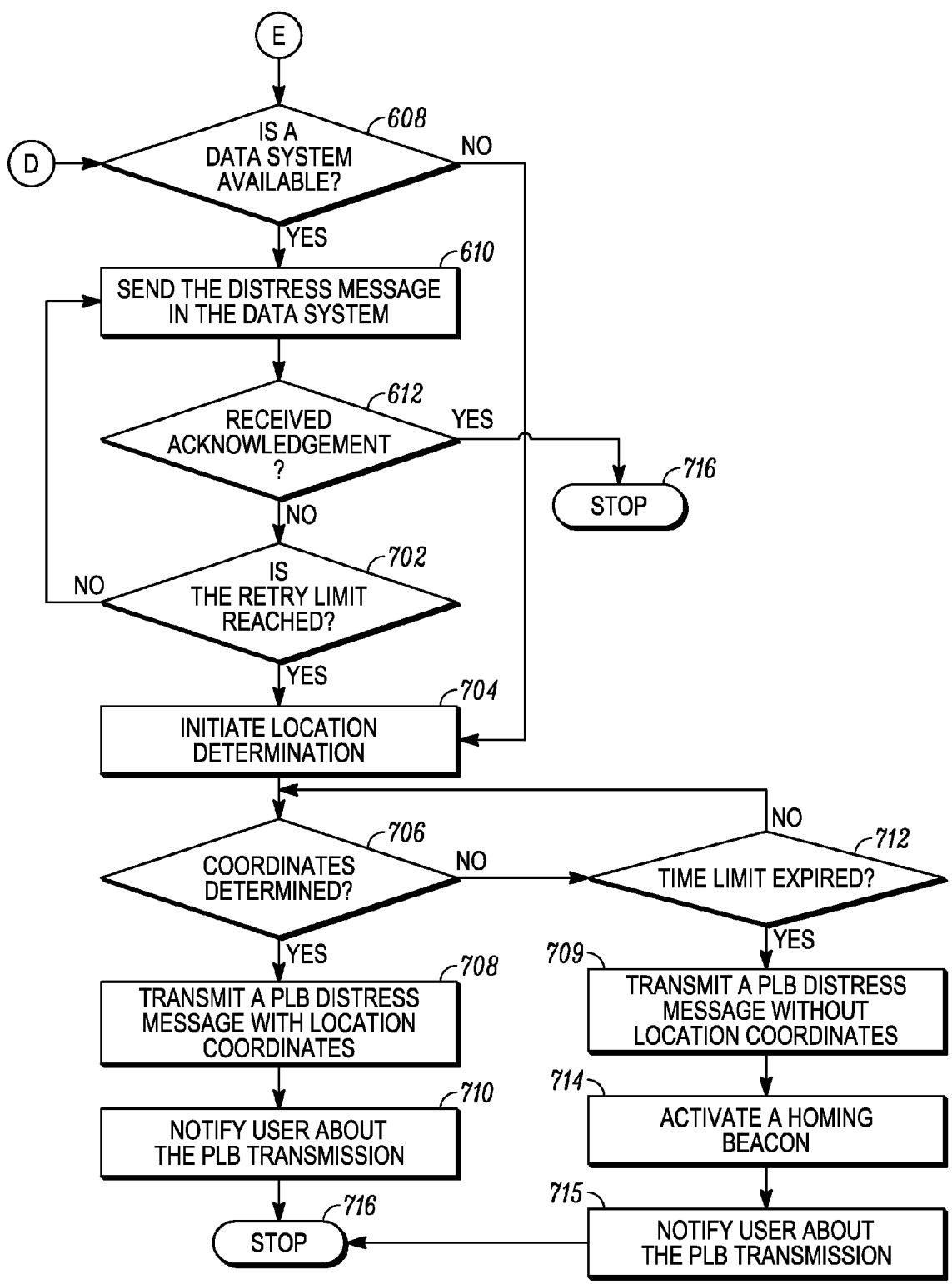

FIG. 4, FIG. 5, and FIG. 6 provide a flow diagram illustrating a method for requesting help, in accordance with another embodiment of the present invention. This embodiment is well-suited for public safety users such as police officers, forest fire-fighting crews and back country rangers operating in a remote region. The communication device 102 can operate on fixed communication systems, including but not limited to, a trunking system, a data system and/or on a conventional repeater system. The communication device 102 can access different communication systems, each possibly operating at different frequency bands. Further, the communication device 102 can function as a PLB and/or a homing beacon.

This embodiment provides a method for receiving help at a least cost and/or as quickly as possible. This is accomplished by means of a distress resource list. For this embodiment, the distress resource list includes a primary trunking system, an alternate trunking system, a mutual-aid frequency system, a data system, and a satellite-based distress system in the specified order. The distress resource list is explained in further detail in conjunction with FIG. 8.

The method is initiated at step 402. At step 404, an emergency call is initiated by a user of the communication device 102. At step 406, the communication device 102 checks whether a primary trunking system is available. If the primary trunking system is available, a distress message is sent to the primary trunking system at step 408. At step 410, a check is made whether an acknowledgement to the distress message is received at the communication device 102. The distress message can include a text message, a voice message or a data message. For example, a first user can send a distress voice message to the primary trunking system. A second user can reply to the distress message, which acts as an acknowledgement. In another example, a radio set in a public safety control room can automatically send an acknowledgement in response to the distress message. If the acknowledgement is received, the user of the communication device 102 is notified about the acknowledgement at step 412. Thereafter, the method is terminated at step 716. When the acknowledgement is not received, a check is made, at step 414, as to whether a predefined retry limit of the number of attempts to transmit the distress message to the primary trunking system has been reached. If the predefined retry limit is not reached, the distress message is sent again to the primary trunking system at step 408. In other words, the distress message is sent to the primary trunking system until, either the acknowledgement is received from the primary trunking system or the predefined retry limit is reached. If the predefined retry limit is reached, step 416 is followed.

Further, if the primary trunking system is unavailable at step 406, a check is made, at step 416, whether an alternate trunking system is available. If the alternate trunking system is available, the distress message is sent to the alternate trunking system, at step 502. Further, a check is made at step 504, whether an acknowledgement is received from the alternate trunking system. If the acknowledgement is received, the user of the communication device 102 is notified about the acknowledgement, at step 506. Thereafter, step 716 is followed and the method is terminated. When the acknowledgement is not received, a check is made at step 508, whether a predefined retry limit of the number of attempts to transmit the distress message to the alternate trunking system has been reached. If the predefined retry limit is not reached, the distress message is sent again, at step 502, to the alternate trunking system. In other words, the distress message is sent to the alternate trunking system until, either the acknowledgement is received from the alternate trunking system or the predefined retry limit is reached. If the predefined retry limit is reached, step 510 is followed.

Further, if the alternate trunking system is unavailable at step 416, a check is made at step 510, whether a mutual-aid frequency system is available. If the mutual-aid system is not available at step 510, the method jumps to step 608 to proceed to check whether a data system is available. If the mutual-aid frequency system is available at step 510, the distress message is sent to the mutual-aid frequency system, at step 512. Further, at step 514, a check is made whether acknowledgement is received from another user on the mutual-aid frequency system. If the acknowledgement is received, a response timer is initiated at step 516 followed by step 602 which determines whether the user has chosen to exit the distress mode of communication device 102. A common means to exit distress mode is to press the emergency button for an extended period of time. If the user chooses to exit the distress mode at step 602, then the method is terminated at step 716. If the user chooses not to exit distress mode at step 602, then a check is made at step 604 whether the predefined time limit is reached. If the predefined time limit is reached at step 604, a check is made if any other channel of the mutual-aid frequency system is available at step 606. If any other channel of the mutual-aid frequency system is not available, then step 608 is followed.

If the predefined time limit is not reached at step 604, then step 602 is followed. The method iterates through steps 602, 604 to allow users to talk for a limited amount of time. A user can exit the loop at step 602 by exiting the emergency mode, or the method will eventually proceed from step 604 to step 606 upon timer expiration.

Further, if the acknowledgement is not received from the mutual-aid frequency system at step 514, a check is made at step 606, as to whether another channel is available. If another channel is available at step 606, then the method returns to step 512 and sends a distress message on that available channel in the mutual-aid frequency system. If no other channel is available at step 606, then a check is made as to whether a data system is available at step 608. If the data system is not available at step 608, then the method jumps to step 704 to initiate location determination. If a data system is available at step 608, then a distress message is sent to the data system at step 610 followed by step 612 where a check is made as to whether the acknowledgement is received from the data system. Once the acknowledgement is received at step 612, step 716 terminates the method. When the acknowledgement is not received at step 612, a check is made at step 702 as to whether the number of attempts to detect the data system has reached a predefined retry limit. If the predefined retry limit is not reached at step 702, the distress message is sent again to the data system at step 610. If the predefined retry limit is reached at step 702, then the step of initiating a location determination of the communication device 102 is performed at step 704.

The step of initiating a location determination at 704 is followed by step 706, where a check is made to detect whether the coordinates of the communication device 102 are determined. If the coordinates are determined at step 706, a PLB distress message is transmitted at step 708. The PLB distress message contains the coordinates of the communication device 102. Further, the user of the communication device 102 is notified about the PLB transmission at step 710. Thereafter, step 716 is followed and the method is terminated.

If the coordinates are not determined at step 706, then a check is made whether a predefined time limit to determine the location of communication device 102 has expired at step 712. Determination of the location of communication device 102 is successively attempted in step 706 until the time limit expires as detected in step 712. If the predefined time limit is expired at step 712, then a PLB distress message without location information is transmitted at step 709. Next, a homing beacon is activated in step 714, and the user of the communication device 102 is notified about the PLB transmission at step 715. The method then terminates at step 716.

Figure 7:
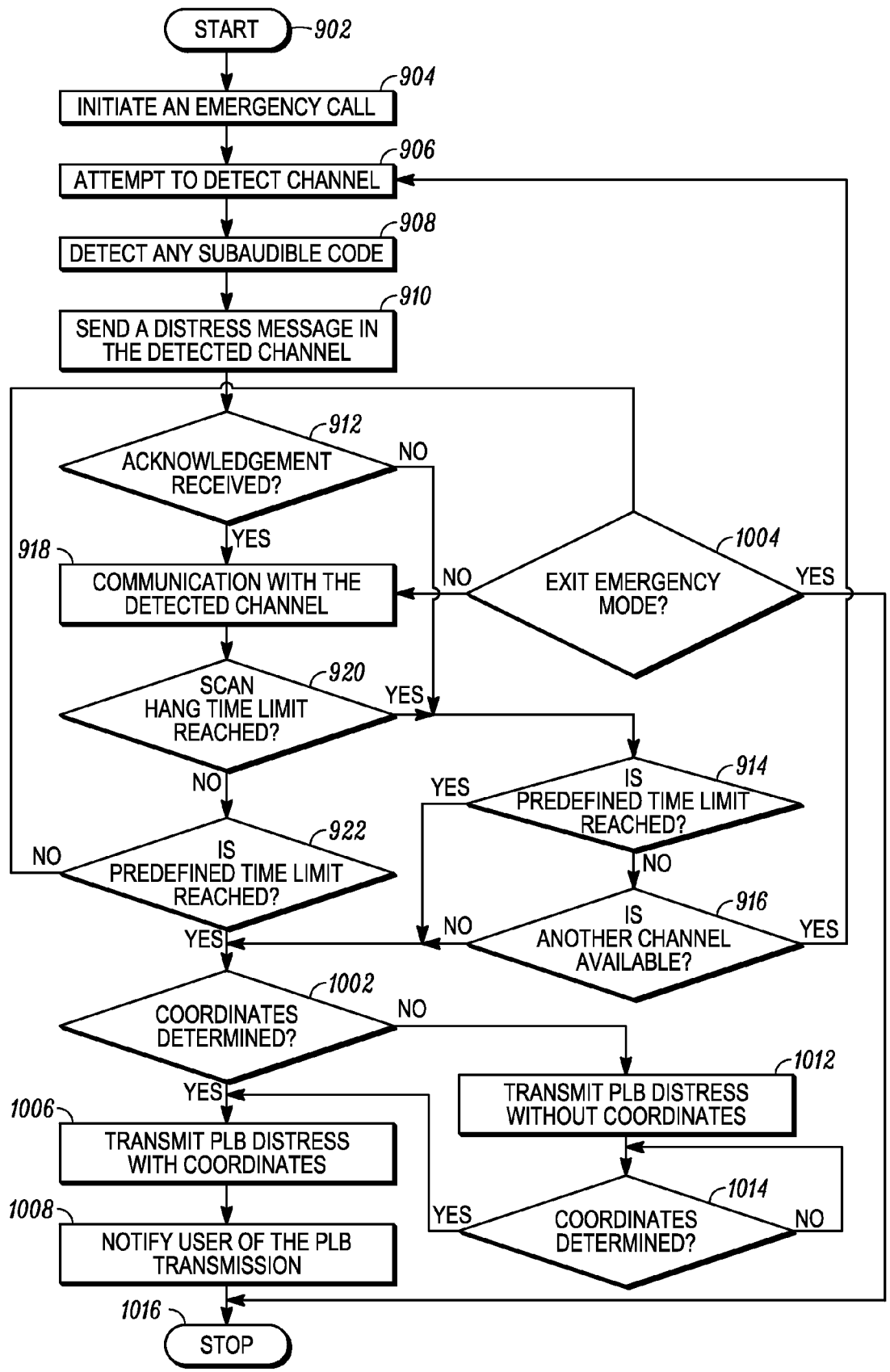
FIG. 7 is a flow diagram illustrating a method for requesting help, in accordance with yet another embodiment of the present invention.

FIG. 7 is a flow diagram illustrating a method for requesting help, in accordance with yet another embodiment of the present invention. This embodiment is well-suited for recreational users such as hikers, hunters and mountaineering enthusiasts. For such users, a communication system having a fixed infrastructure may not be available for communication. In general, the recreational users use a family radio service (FRS) system and/or a general mobile radio service (GMRS) system. FRS is a talk-around communication system only, while GMRS is a system which supports both talk-around and repeater operation. For this embodiment, the distress resource list includes the FRS, the GMRS system and the satellite-based distress system. The distress resource list is explained in further detail in conjunction with FIG. 9.

The method of FIG. 7 is initiated at step 902. At step 904, an emergency call is initiated by a user of the communication device 102. Further, at step 906, attempts are made to detect a channel of the either FRS or GMRS system. At step 908, a sub-audible code of the channel of the FRS or the GMRS system is detected, if any. Common examples of subaudible code systems include CTCSS, CDCSS, Private Line™ (PL), and Digital Private Line™ (DPL). For an embodiment, the detected sub-audible code is substituted for a programmed sub-audible code.

When the sub-audible code of the FRS or the GMRS system is detected at step 908, a distress message is sent in at step 910 using the sub-audible code. If no sub-audible code is detected at step 908, the distress message is still sent at step 910 without a sub-audible code. Further, a check is made at step 912, whether an acknowledgement is received from the detected channel. If the acknowledgement is not received at step 912, then a check is made at step 914, whether a predefined time limit to monitor all of the FRS or the GMRS channels is reached. If the predefined retry limit is reached at step 914, then step 1002 is followed. If the predefined retry limit is not reached at step 914, then a check is made at step 916, as to whether other channels of the FRS or the GMRS system are available. If other channels are available at step 916, then, at step 906, attempts are made again to detect other channels of the FRS or the GMRS system. If another channel is not available at step 916, then step 1002 is followed. At step 1002 a check is made whether coordinates of the communication device 102 are determined.

When the acknowledgement is received at step 912, the user of the communication device 102 can communicate with another user of the detected channel, at step 918. By communicating over the detected channel at step 918, the user can determine whether help can be received from the detected user. Further, a check is made at step 920, as to whether a scan hang time limit has been reached. Within the scan hang time limit, the user can communicate to determine, whether help can be received from the detected channel. The user can communicate until the scan hang time limit is reached at step 920. When the scan time limit is reached, step 914 is followed.

When the scan hang time limit is not reached at step 920, a check is made at step 922, as to whether the predefined retry time limit is reached. When the predefined retry time limit is not reached at step 922, the user can exit the emergency call by, for example, a long-press of an emergency button for a predefined time limit at step 1004, or other predefined exit means. Thereafter, step 1016 is followed and the method is terminated. If the user does not long-press the emergency button for the predefined time limit, at step 1004, then step 918 is followed.

If the predefined retry time limit is reached at step 922, then the method proceeds to step 1002 to determine whether the coordinates of the communication device 102 are known or determined. When the coordinates of the communication device 102 are determined, a PLB distress is transmitted along with the coordinates of the communication device 102 at step 1006. The user of the communication device 102 is notified of the PLB transmission at step 1008. The method is thereafter terminated at step 1016. When the coordinates are not determined at step 1002, a PLB distress is transmitted at step 1012 without the coordinates of the communication device 102. At step 1014, a check is again made to determine whether the coordinates are determined. When the coordinates are determined at step 1014, the PLB distress is transmitted with the coordinates at step 1006. When the location of communication device 102 is not determined at step 1014, further attempts are made to determine the coordinates at step 1014.

FIG. 8 illustrates an exemplary predefined sequence 1100, in accordance with one embodiment of the present invention. The predefined sequence includes a list of communication systems, arranged according to a priority assigned to each of the communication systems. The predefined sequence 1100 includes a primary trunking system, an alternate trunking system, a mutual-aid frequency system, a data system and a satellite-based distress system. The exemplary predefined sequence 1100 is well-suited to public safety users such as police officers, forest fire-fighting crews and back country rangers operating in remote regions. These communication systems are arranged according to the predefined assigned priorities. The priority is preferably assigned based on the time required to receive help at the communication device 102, and/or the cost incurred in providing help at the communication device 102. For example, due to the fact that the primary trunking system is a local communication system, help can be received quickly and at a lower cost in the primary trunking system than in any other communication system. Therefore, the primary trunking system is assigned the highest priority and is the first network in which a distress message is sent.

Though the exemplary predefined sequence 1100 is shown to include the primary trunking system, the alternate trunking system, the mutual-aid frequency system, the data system, and the satellite-based distress system, it will be understood by a person of ordinary skill in the art that the sequence may include a list of any other types of communication systems as well and that the priorities may be reassigned if needed.

FIG. 9 illustrates an exemplary predefined sequence 1200, in accordance with another embodiment of the present invention. The predefined sequence includes an FRS, a GMRS system and a satellite-based distress system. The predefined sequence 1200 is well-suited for recreational users. In the predefined sequence 1200, the FRS or the GMRS system is assigned a higher priority than the satellite-based distress system.

FIG. 10 is an example of the communication device 102, such as a two-way radio, formed in accordance with an embodiment of the invention and is discussed in relation to the designators of FIGS. 1 and 2. In this example, communication device 102 is a two-way radio including transceiver portion 206, controller portion 212, memory 204, such as internal flash memory and removable flash memory. Transceiver portion 206 enables communication with a satellite based distress system in addition to terrestrial based communication systems. Memory 204 stores radio applications capable of operating with the plurality of communication systems 104, 106, 108, 110, along the storage of PLB applications and user identity information. GPS functionality 222 enables location determination of the user. The distress resource list including the sequence of priority is stored within memory 204 and can, if needed, be modified. A remote speaker microphone (RMS) 240 is shown optionally coupled to the radio to provide an external memory device 202 for storing user identity externally, if desired. The identity key can be embedded in the radio or can be a removable memory element of the radio or the identity key can alternatively be embedded in the RMS or can be a removable memory element that couples to the RMS.

FIG. 11 is another example of a communication device formed in accordance with the present invention. In this embodiment, the user's identity is shown integrated with a microphone of the remote speaker microphone 240. An identity key 202 is provided by an identity button for providing and removing a user's identity. Long emergency key presses can be accomplished via keypad 210, a push-to-talk (PTT) button or other option button.

FIGS. 10 and 11 are provided as examples of radio configurations that can be used within system 100 to accomplish the methods for a user to request help amongst the plurality of systems 104, 106, 108, 110 and 112 in a distress situation. Other radio configurations can also be used. For example, one skilled in the art may include multiple receivers and transmitters or a single receiver and transmitter capable of handling multi-band operation.

Various embodiments of the present invention offer the following advantages. The present invention provides a method and system for requesting help by a user of a communication device. Further, the present invention eliminates the need of separate communication devices for location detection and communication. This leads to lower cost and convenience to the user. Further, the present invention provides a method for detecting a communication system to receive help in the least possible time and at the least possible cost. Moreover, the present invention also enables use of a removable memory for the identification of the user. This allows mobility of the identity key along with the user, which is especially useful if the communication device is damaged. The use of a detachable identity key for the communication device reduces the cost as well. Emergency and distress signaling capability can operate seamlessly both within a private communication system range and outside traditional coverage. Furthermore, public safety users can now initiate a distress call, by utilizing a plurality of communication systems including a COSPAS-SARSAT distress system. The present invention also provides a method to select a precedence of emergency communication systems to be used for distress communication. Further, the method involves the optional use of a transferable or movable identity and may or may not involve a permanent communication device assignment. Further, in this method, recreational users can initiate a distress call that first attempts to contact other local recreational users before accessing the more costly satellite distress system. Still further, the present invention provides a method to notify responders of the communication system or the frequency of the distressed user to facilitate communication.

The present invention also provides a method to provide access control of the PLB functionality by detecting and validating the user identity. Moreover, the integration of PLB operation into a traditional two-way radio provides distress features, allows precedence of communication systems and attempts to find immediate local assistance by seeking local channel activity, thereby, providing significant advantages over past software and hardware enabled satellite-based distress systems. The method and apparatus of present invention provides for the seamless integration of personal locator beacon functionality with the traditional emergency signaling capabilities of a two-way radio. The method will allow distress messages to be communicated even if a user in distress is incapacitated. By automatically advancing through and transmitting to the predefined communication systems specified in the distress resource list, the distressed user can receive help, even if incapacitated.

In the foregoing specification, the invention and its benefits and advantages have been described with reference to specific embodiments. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

What is claimed is:

1. A method for requesting help by a user of a communication device, the method comprising:

initiating an emergency call by the user of the communication device;

successively attempting at the communication device, to transmit a distress message to a communication system from a plurality of communication systems based on a predefined sequence, wherein the predefined sequence comprises a list of the plurality of communication systems arranged according to a priority, wherein the priority is assigned based on cost incurred in providing help to the user; and automatically sending the distress message to a satellite-based distress system when attempts to detect the communication system of the plurality of communication systems based on the predefined sequence have failed.

2. The method as recited in claim 1 further comprising determining coordinates of the communication device, the coordinates being determined to locate the user of the communication device.

3. The method as recited in claim 1, wherein the communication system is detected for one of a predefined time limit and a predefined retry limit.

4. The method as recited in claim 1, wherein the communication system includes at least one of: a primary trunking system, an alternate trunking system, a cellular system, a data system, a mutual-aid frequency system, a family radio service (FRS) system, a general mobile radio service (GMRS) system, along with the satellite-based distress system.

5. The method as recited in claim 1, wherein the distress message comprises at least one of an identification of the communication device, an identification of the user of the communication device, coordinates of the communication device, status of emergency, and a contact frequency.

* * * * *